(12) United States Patent
Middleton

(10) Patent No.: US 6,259,459 B1
(45) Date of Patent: Jul. 10, 2001

(54) APPARATUS AND METHOD FOR IMAGE DATA PROCESSING OF PIXEL DATA IN RASTER LINES

(75) Inventor: Peter Guy Middleton, Cambridge (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 09/108,286

(22) Filed: Jul. 1, 1998

(30) Foreign Application Priority Data

Mar. 6, 1998 (GB) .................................................. 9804880

(51) Int. Cl.[7] .............................. G06F 13/00; G06F 15/16
(52) U.S. Cl. ........................ 345/536; 345/503; 345/533; 345/557
(58) Field of Search ..................................... 345/501–503, 345/521, 523, 526, 507, 513, 516, 511, 508, 509

(56) References Cited

U.S. PATENT DOCUMENTS

| | | | |
|---|---|---|---|
| 5,539,891 | * | 7/1996 | Childers et al. ............................ 711/5 |
| 5,596,659 | * | 1/1997 | Normile et al. ......................... 382/253 |
| 5,671,020 | * | 9/1997 | Law ....................................... 348/608 |
| 5,673,422 | * | 9/1997 | Kawai et al. ........................... 345/519 |
| 5,822,760 | * | 10/1998 | Yoshizawa et al. .................... 711/137 |
| 5,910,909 | * | 6/1999 | Purcell et al. .......................... 708/322 |
| 6,000,007 | * | 12/1999 | Leung et al. ............................ 711/105 |

* cited by examiner

Primary Examiner—Ulka J. Chauhan
(74) Attorney, Agent, or Firm—Nixon & Vanderhye P.C.

(57) ABSTRACT

An image processing system is described in which a data buffer memory 4 is provided between an image processor 2 and an image frame memory 8. The data buffer memory 4 stores a sub-set of the raster lines stored within the image frame memory 8. This data can be read in either an intra-raster-line mode from adjacent memory cells within a bank or in an inter-raster-line mode from memory cell locations at corresponding positions within different banks. The data may be 8-bit pixel data or 16-bit pixel data. In the case of 8-bit pixel data a single bank contains a full raster line whereas in the case of 16-bit pixel data a single raster line extends over two banks.

17 Claims, 9 Drawing Sheets

APPARATUS AND METHOD FOR IMAGE DATA PROCESSING OF PIXEL DATA IN RASTER LINES

BACKGROUND OF THE INVENTION

1. Field of the Invention

This invention relates to image data processing. More particularly, this invention relates to image data processing of pixel data arranged in raster lines and stored within an image frame memory prior to being manipulated by an image processor.

2. Description of the Prior Art

It is known to provide image-processing systems that include an image frame memory for storing raster lines of pixel data. The pixel data is read from the image frame memory one raster line at a time to drive a display device. The image pixel data is also read from the image frame memory by an image processor that performs manipulations, such as filtering operations, upon the pixel data.

It is a constant aim within image data processing systems to increase the speed with which the processing is performing. In addition, it is also highly desirable, particularly in portable and battery powered devices, that the power consumption should be reduced.

SUMMARY OF THE INVENTION

Viewed from one aspect of the present invention provides, an apparatus for processing image data, said apparatus comprising:

(I) an image frame memory for storing pixel data defining an image, said pixel data being divided into raster lines of pixel data values;

(ii) a data buffer memory, coupled to said image frame memory via an image frame memory bus, for storing a subset of said raster lines of pixel data values defining said image;

(iii) an image processor, coupled to said data buffer memory via an image processor bus, for performing image processing upon said subset of said raster lines of pixel data values stored in said data buffer memory; wherein (iv) said data buffer memory has a plurality of banks of memory cells, each bank of memory cells being divided into a plurality of rows and a plurality of columns of memory cells;

(v) said image processor bus transfers data words between said data buffer memory and said image processor, each data word comprising pixel data values for a plurality of pixels within said image;

(vi) said image processor and said data buffer memory being operable in an intra-raster-line mode to read one bank of memory cells to transfer a data word comprising a plurality of spatially adjacent pixel data values from within one raster line; and (vii) said image processor and said data buffer memory being operable in an inter-raster-line mode to read a plurality of banks of memory cells to transfer a data word comprising a plurality of pixel data values from within differing raster lines.

The present invention recognizes that the way in which the image frame memory stores raster lines of pixel data, whilst well suited to driving a display device, is not as well suited to providing access to that data by the image processor in an efficient manner. In particular, the image processor will often wish to access the same pixel values in several different orders depending upon the manipulation being performed. For example, a horizontal spatial filtering operation will usually access the pixel values along the direction of the raster lines, whilst a vertical spatial filtering operation will access the pixel data values in a direction perpendicular to the raster lines, whilst temporal filtering will access pixel data values from equivalent raster lines in different frames.

With modem image processors, it is usual for pixel values to be transferred between the memory devices and the processor on a relatively wide bus several pixel values at that time. This is efficient in increasing speed and reducing power consumption. However, unless the pixel values are arranged in a suitable order within the image frame memory, then such multiple pixel data value transfers cannot readily be performed. A standard image frame memory is normally accessed by providing a start address beginning with which a sequence of pixel values along the raster line direction are returned. Accordingly, in the case of a vertical filter operation in which the required pixel data values are not in sequential address order within the frame memory, many more memory accesses have to be performed, or the image processor has to have a large register capacity in order to itself buffer sufficient pixel values to put them into the necessary vertical order.

The present invention addresses this problem by providing a special purpose data buffer memory between the image frame memory and the image processor. This data buffer memory stores a number of raster lines of pixel data (a subset of the raster lines stored by the image frame memory) and allows the image processor to access these in different orders that are better suited to the requirements of the image processor. In particular, the raster data may be written into the banks of memory cells in one order, but read from the data buffer memory in a different order using data words comprising multiple pixel values thus making full use of the available bus bandwidth and reducing the burden upon the image processor to provide reordering or bit slicing functions.

One type of manipulation that often needs to be performed by image processors is horizontal filtering. Accordingly, in the preferred embodiments of the invention, in said intra-raster-line mode, said image processor performs spatial filtering in a direction along said one raster line.

When operating in the inter-raster-line mode, the pixel data values could be taken from memory cells having different relative locations within each bank. However, the control and operation of the data buffer memory are improved in embodiments in which said data word comprises a plurality of pixel data values taken from corresponding row and column positions within each of a plurality of different banks of memory cells.

Whilst the present invention provides advantages for image processors performing many different types of image data manipulation, the advantages are particularly strong and the problem addressed otherwise burdensome in embodiments in which said plurality of banks of memory cells store spatially adjacent raster lines, said data word comprises spatially adjacent pixel data values in a direction perpendicular to said raster lines and said image processor performs spatial filtering in said direction perpendicular to said raster lines.

Another advantageous application of the invention arises in embodiments in which said plurality of banks of memory cells store temporally adjacent raster lines, said data word comprises temporally adjacent pixel data values from a common spatial position within said image and said image processor performs temporal filtering at said common spatial position.

The present invention may be implemented without requiring excessive modification to existing image processors by providing preferred embodiments in which plurality of banks of memory cells within said data buffer memory form a contiguous address space that is accessed using addresses generated by said image processor.

In this way, the image processor can use its normal ability to generate addresses for memory accesses and have these interpreted by the data buffer memory depending upon the mode in which the system is operating to a return the appropriate pixel data values within the data word. The image processor needs to control the mode, but this may be relatively easily managed using registers storing control flags that are written under program control by the image processor.

Depending upon the size of each pixel data value, the banks of the memory cells may be able to store multiple, one or less than one raster line. Having the data buffer memory store multiple raster lines within one bank is somewhat wasteful as the image frame memory is already storing multiple raster lines within a block. In this circumstances it would be more efficient to consider reducing the data buffer memory size to reduce the circuit area and expense of the system. Accordingly, it is most advantageous to match the pixel value size and data buffer memory capacity such that each bank of memory cells stores either one or a fraction of one raster line. When the system is operating with raster lines spread over multiple banks of memory cells, the inter-raster-line mode needs to operate to recover pixel data values to be placed into the data word in a manner which takes this factor into account.

Accordingly, in preferred embodiments of the invention, said banks of memory cells has a size of M separately addressable storage locations, each of said raster lines is stored over N banks of memory cells, and, in said inter-raster-line mode, said data word comprises pixel data values spaced by M*N address locations within said address space.

In practice it is found most advantageous to operate systems in which N=1 or 2.

In order to ease the flow of data between the image frame memory and the data buffer memory, preferred embodiments of the invention are ones in which a line buffer is disposed in said image frame memory bus between said image frame memory and said data buffer memory, said line buffer serving to buffer a plurality of pixel data values that are transferred in parallel between said line buffer and a full row of memory cells.

The provision of a line buffer is particularly advantageous in embodiments in which said image processor is prevented from accessing said data buffer memory whilst said plurality of pixel data values are transferred in parallel between said line buffer and said full row of memory cells, said image processor being permitted to access said data buffer memory whilst pixel data values are transferred between said line buffer and said image frame memory.

In practice it has been up found that fewer data words require writing back from the image processor to the data buffer memory than require reading from the data buffer memory to the image processor. Accordingly, the design of the system can be simplified and the system and rendered less expensive without compromising efficiency in embodiments in a which said image processor writes pixel data values to said data buffer memory as processing operations that write to a single bank of memory cells within said data buffer memory. In this way parallel data writes to multiple banks of memory cells by the image processor are not supported, but in practice this is found not to be a significant disadvantage.

Whilst the present invention could be used in many different hardware environments with differing components, the invention is particularly well suited to systems in which the image frame memory is the video RAM or SDRAM and the image processor is a microprocessor operating under program instruction control Whilst it is possible for the banks of memory cells to store the pixel data values in various ways, it is strongly advantageous to provide embodiments in which pixel data values from within a raster line of said subset of raster lines of pixel data values are stored within memory cells of respective consecutive rows of memory cells within a bank of memory cells.

This arrangement allows the division of the data buffer memory between banks of memory cells to be exploited more effectively in providing multiple different ways in which a data word to be transferred to the image processor can be built up of a pixel data values from different raster lines.

In order to decrease the need to reload data into the banks and to accommodate image processors that do not provide byte rotation, preferred embodiments of the invention provide a reordering circuit for selecting the order in which said pixel data values are concatenated together to form said data word.

Viewed from another aspect of the present invention provides a method of processing image data, said method comprising the steps of (i) storing pixel data declining an image within an image frame memory, said pixel data being divided into raster lines of pixel data values;

(ii) storing a subset of said raster lines of pixel data values defining said image within a data buffer memory, said data buffer memory being coupled to said image frame memory via an image frame memory bus;

(iii) performing image processing upon said subset of said raster lines of pixel data values stored in said data buffer memory with an image processor, said image processor being coupled to said data buffer memory via an image processor bus; wherein (iv) said data buffer memory has a plurality of banks of memory cells, each bank of memory cells being divided into a plurality of rows and a plurality of columns of memory cells, pixel data values from within a raster line of said subset of raster lines of pixel data values be stored within memory cells of respective consecutive rows of memory cells within a bank of memory cells;

(v) said image processor bus transfers data words between said data buffer memory and said image processor, each data word comprising pixel data values for a plurality of pixels within said image;

(vi) said image processor and said data buffer memory being operable in an intra-raster-line mode to read one bank of memory cells to transfer a data word comprising a plurality of spatially adjacent pixel data values from within one raster line; and (vii) said image processor and said data buffer memory being operable in an inter-raster-line mode to read a plurality of banks of memory cells to transfer a data word comprising a plurality of pixel data values from within differing raster lines.

The above, and other objects, features and advantages of this invention will be apparent from the following detailed description of illustrative embodiments which is to be read in connection with the accompany drawings.

DESCRIPTION OF THE PREFERRED EMBODIMENTS

Figure 1:
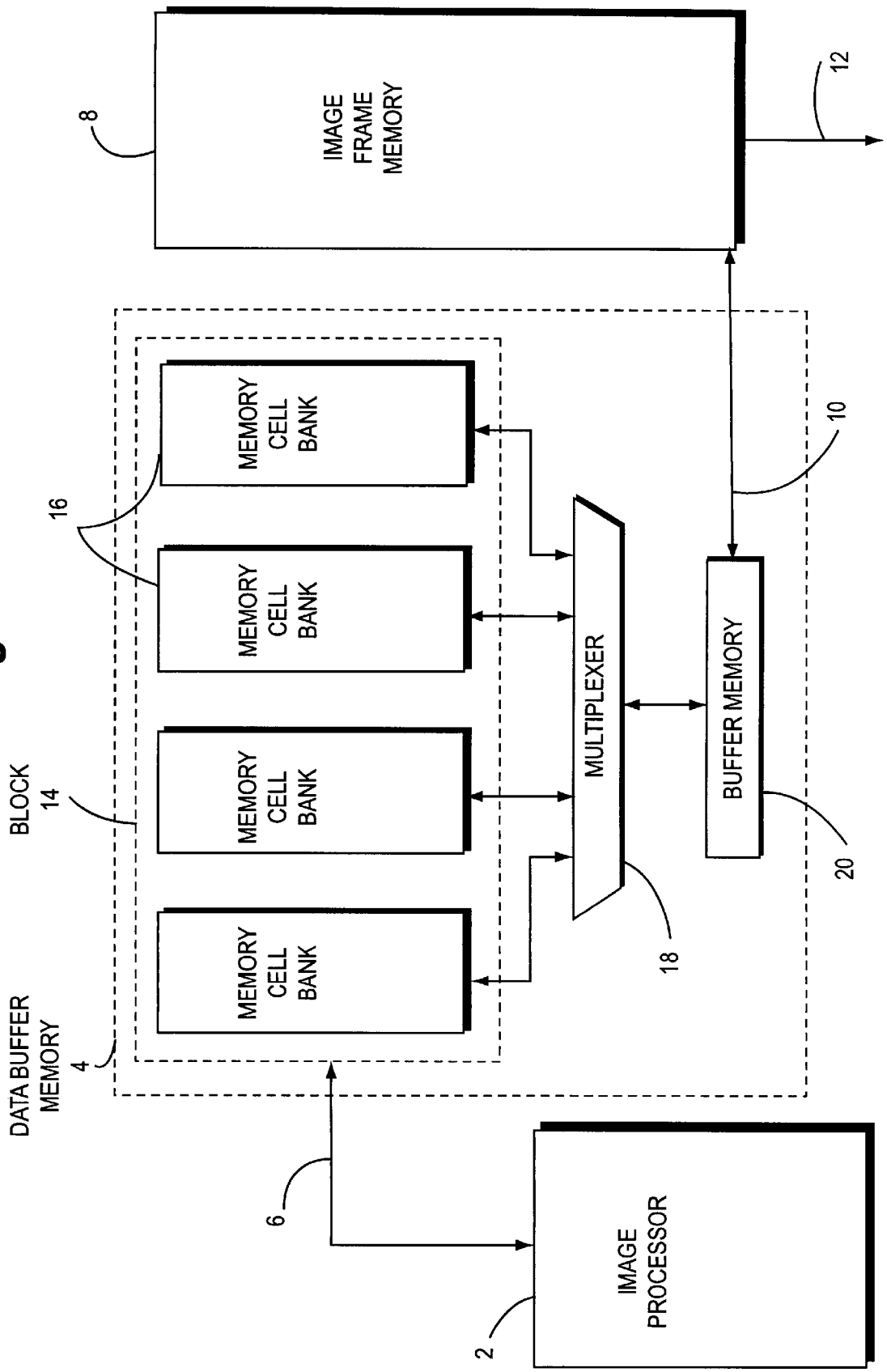
FIG. 1 schematically illustrates an image processing system in accordance with one embodiment of the invention.

FIG. 1 shows an image processing apparatus comprising an image processor 2, in the form of a general purpose microprocessor controlled by a program instructions, coupled to a data buffer memory 4 by an image processor bus 6. The data buffer memory 4 is in turn coupled to an image frame memory 8 by an image frame memory bus 10. The image frame memory 8 is a video RAM memory that drives a display device via a raster line output 12.

Within the data buffer memory 4 there is a block 14 of four banks 16 of memory cells. Each bank 16 of memory cells comprises 32 rows, each row containing 32 bytes. A multiplexer 18 serves to select which row of pixel data values stored within the banks 16 is supplied to or read from a line buffer memory 20 whilst being transferred via the image frame memory bus 10 to or from the image frame memory 8.

In operation, raster lines of pixel data values are read from the image frame memory 8 into the line buffer 20 via the image frame memory bus 10. These raster lines of data are then loaded into one or more of the banks 16 of memory cells via the multiplexer 18. Most commonly, a whole raster line from within the image frame memory 8 is written into a single bank 16 of memory cells. The pixel data values are written into consecutive rows within the bank 16 with horizontally spatially adjacent pixel values being written to cells within adjacent rows in the memory.

Once the pixel data values have been loaded into the data buffer memory 4, the image processor 2 can then read these pixel data values to perform image processing manipulations, such as horizontal, vertical or temporal filtering. The order in which the pixel data values need to be passed to the image processor 2 depends upon the manipulation being performed. The image processor 2 knows the manipulation it is about to perform and so can set the appropriate read mode, e.g. by writing read mode flags. In the case of a horizontal filtering operation, then it is advantageous for the image processor 2 to receive the data from horizontally spatially adjacent pixel locations within a single data word upon the image processor bus 6. The image processor bus 6 is 32-bits wide and accordingly can transfer four 8-bit pixel data values in parallel between the data buffer memory 4 and the image processor 2. Such a data transfer is an intra-raster-line transfer. The image processor 2 and the data buffer memory 4 operate in an intra-raster-line mode in which a start address supplied by the image processor 2 to the data buffer memory 4 results in the return of a sequence of pixel data values stored at adjacent positions within a row of memory cells of a single bank 16 starting from the address specified.

The pixel data values may be 8-bit data values or 16-bit data values. Depending upon which size of pixel data value is involved, a data word transferred between the data buffer memory 4 and the image processor memory 2 will contain either four 8-bits data values or two 16-bit data values. In either case, the full bandwidth of the image processor bus 6 is utilised during each transfer.

The above described intra-raster-line mode of operation is generally less problematic than when it is desired to process pixel data values that are not conveniently located in sequential addresses within the banks 16. An example of this is a vertical filtering operation in which pixel data values from vertically adjacent pixel positions within the fill image are processed together. These vertically adjacent pixel data values will be present in different raster lines and accordingly will be stored in respective different ones of the banks 16. Whilst it would be possible to adjust the manner in which the pixel data values were written into the banks 16 to accommodate such reading, this would then mean that the data arrangement was unsuitable for horizontal filtering. The overhead in the re-writing the data in a different order into the banks 16 depending upon read mode would be disadvantageously high since the read mode will often change, e.g. a sequence of a horizontal and then a vertical operation on the pixel values from the same raster lines.

In order to address this problem, the data is arranged in the same way as described above in relation to horizontal filtering and is then read in an inter-raster-line mode specially provided by the data buffer memory 4. In the case of 8-bit pixel data values, the inter-raster-line mode operates to return as a data word pixel data values stored at the same row and column position within all of the four different banks 16 starting with the specified address. In the case of 16-bit pixel data values, a single raster line is stored over two banks 16 and the pixel data values returned together as a data word are returned from respective different banks 16 spaced apart by one bank, such that the pixel data values correspond to the same position with the image frame.

Further examples of different filtering operations and modes of access to the data buffer memory 4 will be described below in relation to FIGS. 2, 3, 4 and 5.

Figure 2:
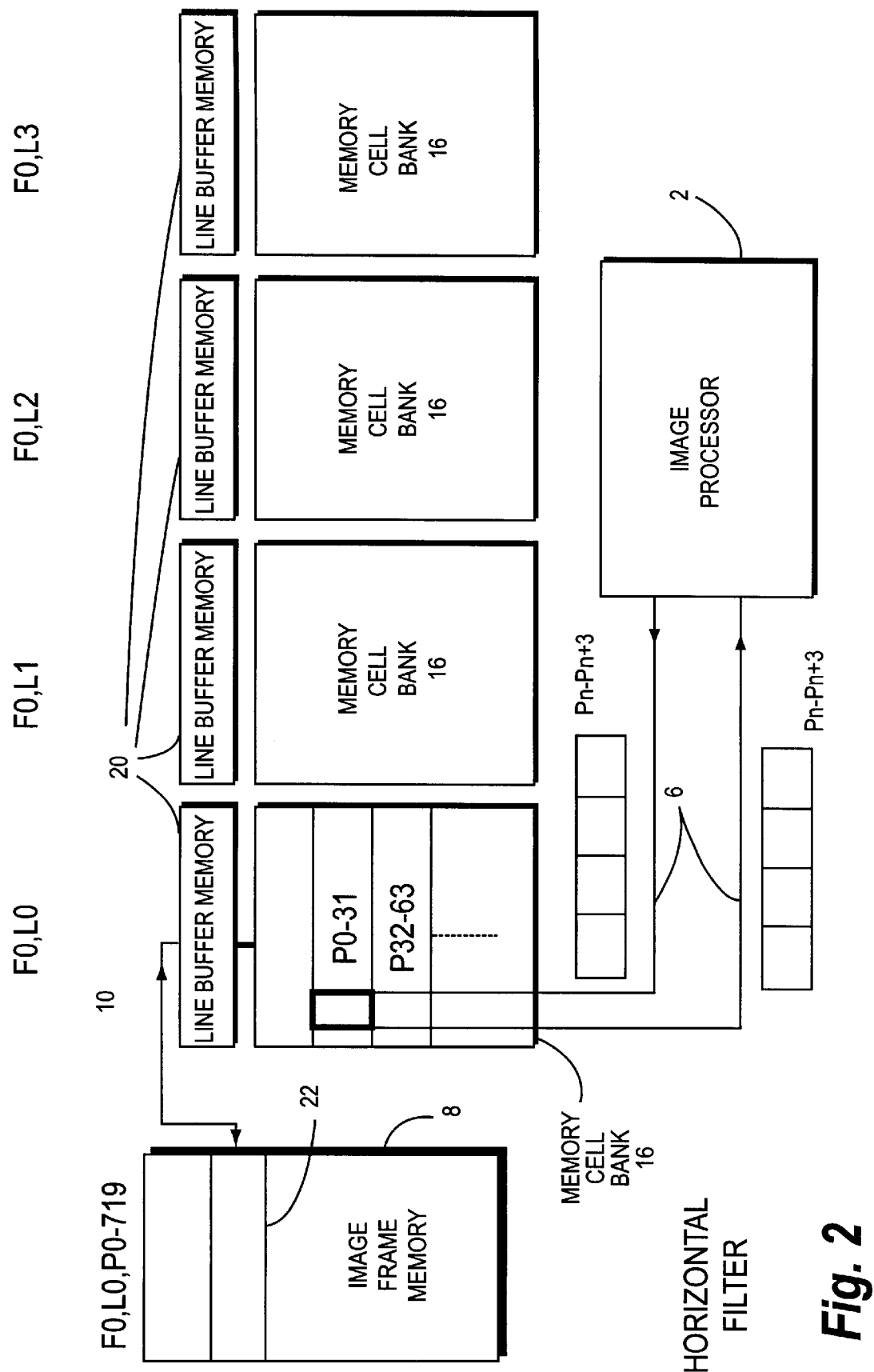
FIG. 2 illustrates the operation of the image processing system in an intra-raster-line mode.

FIG. 2 illustrates a horizontal filtering operation that is conducted when the system is operating in the intra-raster-line mode. The image frame memory 8 stores a complete frame of data composed of a series ofhorizontal raster lines. Each raster line contains 720 active pixels in this example. In higher resolution systems there will be more pixel values per raster line. The raster line 22 shown in FIG. 2 corresponds to frame 0, line 0. If the pixel data values are 8-bit data values, then these are transferred to the line buffer 20 four pixel values at a time via the 32-bit image frame memory bus 10. When eight of these data words have been transferred to the line buffer 20, the line buffer 20 will contain 32 8-bit data values that are sufficient to completely fill one row of memory cells within one of the banks 16. These pixel data values are then written in parallel into one row of a bank 16. During this parallel write, access to the data buffer memory 4 by the image processor 2 is suspended as otherwise erroneous operation may occur.

Horizontally adjacent pixels within the image result in pixel data values that are horizontally adjacent within a row of memory cells of the bank 16. Thus, pixel data values 0 to 31 are contained in one row, pixel values 32 to 63 are contained in the following row and so forth Once the pixel data values for a complete raster line have been loaded into the bank 16, then they may be accessed by the image processor 2. In practice, 720 pixel data values will occupy 23 rows of the bank 16. In the intra-raster-line mode of operation, the image processor reads data words comprising four horizontally adjacent pixel values as one operation. These pixel data values are then stored within a data processing register of the image processor 2 from where they can be manipulated under program instruction control to achieve the desired filtering result.

After the horizontal filtering operation has completed, the filtered pixel values can be written back to the bank 16 as a four pixel value data word. Since all of the pixel data values are being written back to the same bank 16, they can be written back simultaneously as one operation.

Figure 3:
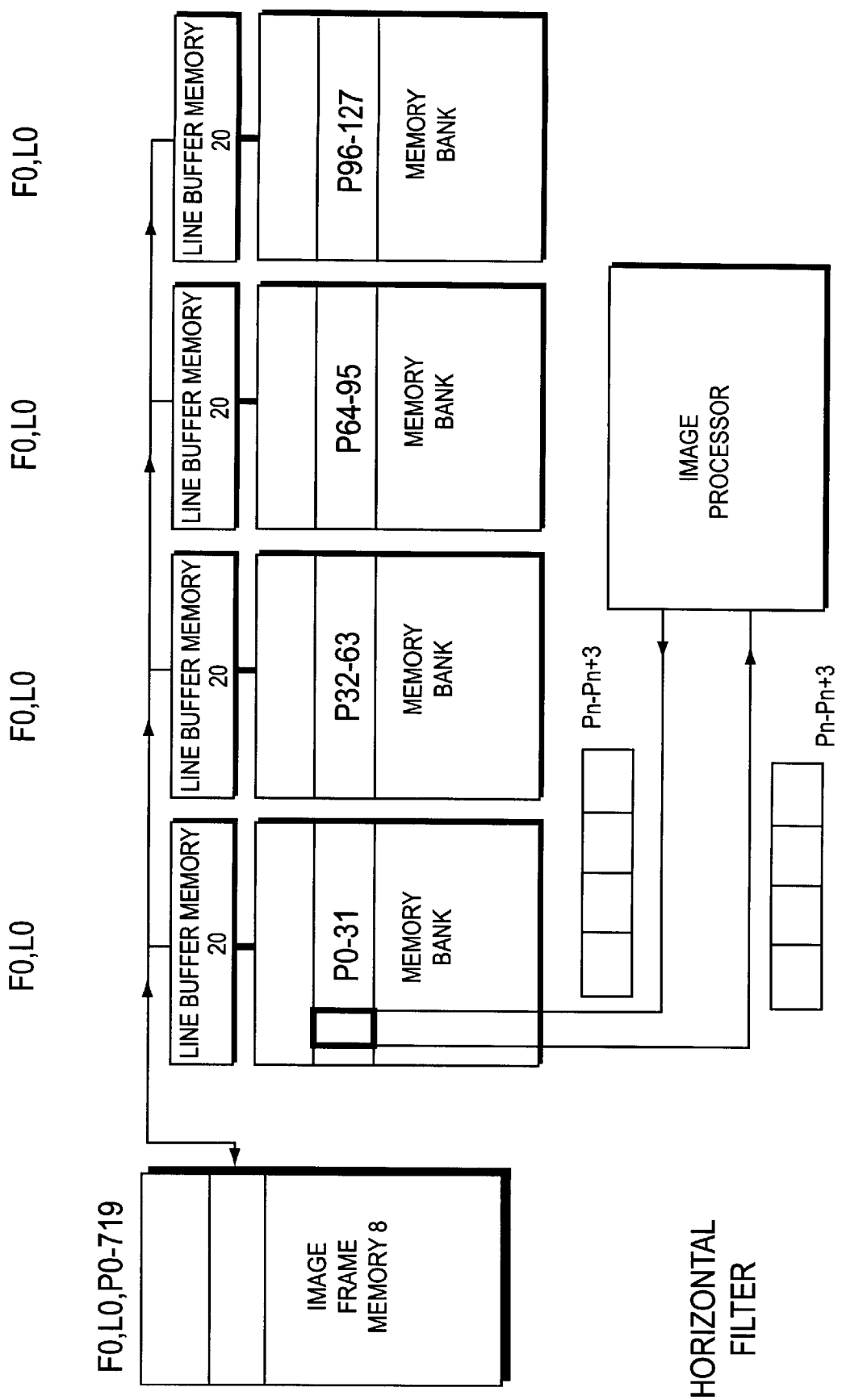
FIG. 3 illustrates the operation of the image processing system in an intra-raster-line mode in which a single raster line is spread between different banks of memory cells.

FIG. 3 illustrates a variation in the horizontal filtering operation shown in FIG. 2. In this example, the pixel data values from a single raster-line within the image frame memory 8 are spread across all of the four banks 16. The system still operates in an intra-raster-line mode whereby data words are assembled from horizontally adjacent memory cells with a row of one bank 16.

Figure 4:
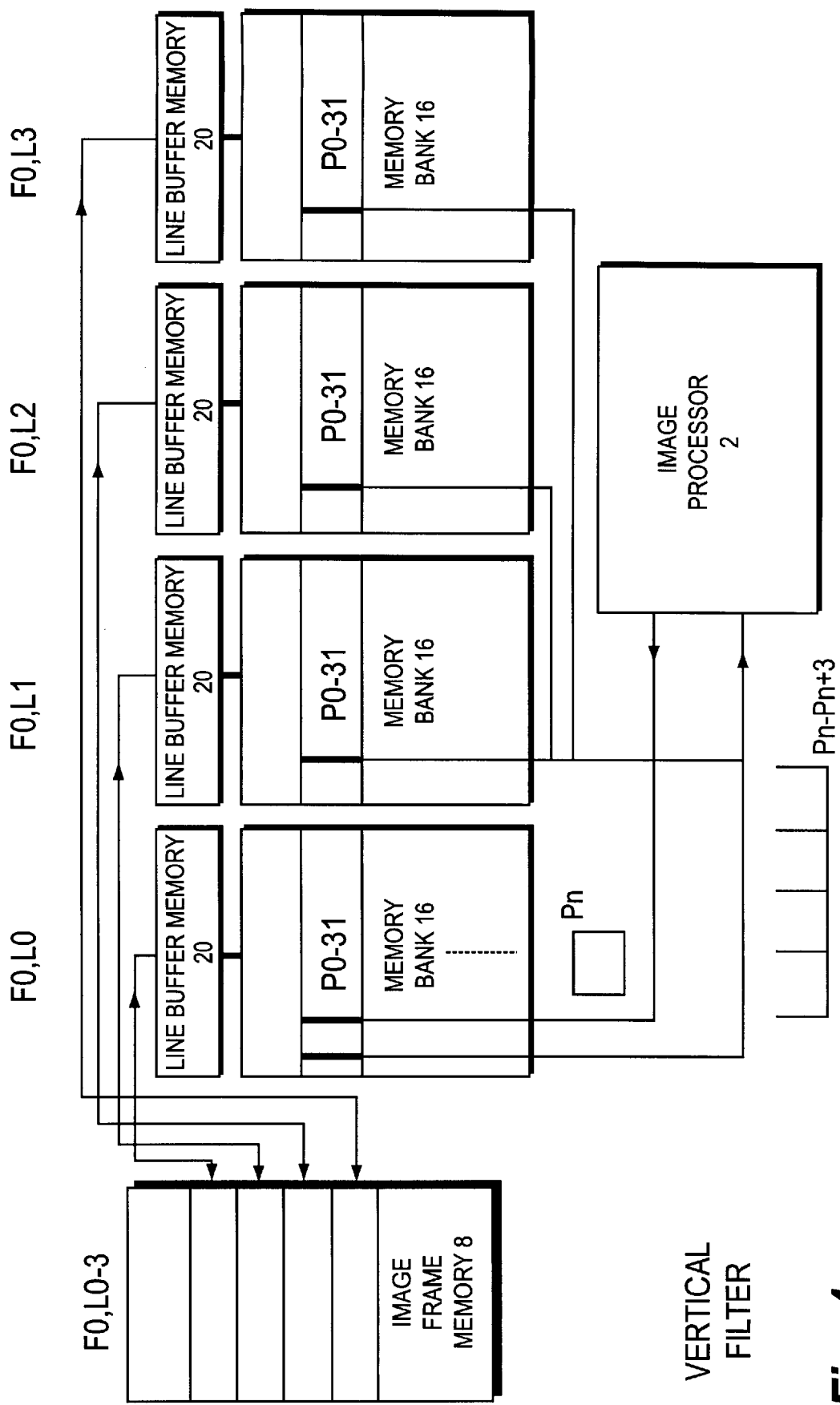
FIG. 4 illustrates the operation of the image processing system in an inter-raster-line mode performing a vertical filtering operation.

FIG. 4 illustrates a vertical filtering operation. In this situation, each raster line from the image frame memory 8 is written to its own bank 16 of memory cells. The banks 16 thus respectively store the raster lines 0, 1, 2 and 3 in the example illustrated. In this case, the image processor 2 needs to manipulate pixel data values from vertically adjacent raster lines. These pixel data values all have the same horizontal position within their respective raster line. Thus, within this inter-raster-line mode, a data word for transfer to the image processor 2 is assembled from pixel data values all having the same row and column position within their respective bank for each of the four banks 16. For example, if it were the pixel position 7 within the raster lines that was being vertically filtered at this time, then the data word would be built up of the pixel data values F0, L0, P7; F0, L1, P7; F0, L2, P7 and F0, L3, P7.

Once the image processor 2 had performed its vertical filtering operation upon these data values, then the resulting pixel data value needs to be written back to the data buffer memory 4. In practice, many pixel data values need to be read to generate a single pixel data value to be written back. Thus, the system may be simplified without any undue loss of performance if it is constrained such that only a single bank 16 may be written to by the image processor 4 at any given time. Thus, should four pixel data values need to be written back to respective positions with their vertically adjacent raster lines, then this would be done as four separate operations with one pixel data value being written to one bank in each operation.

Figure 5:
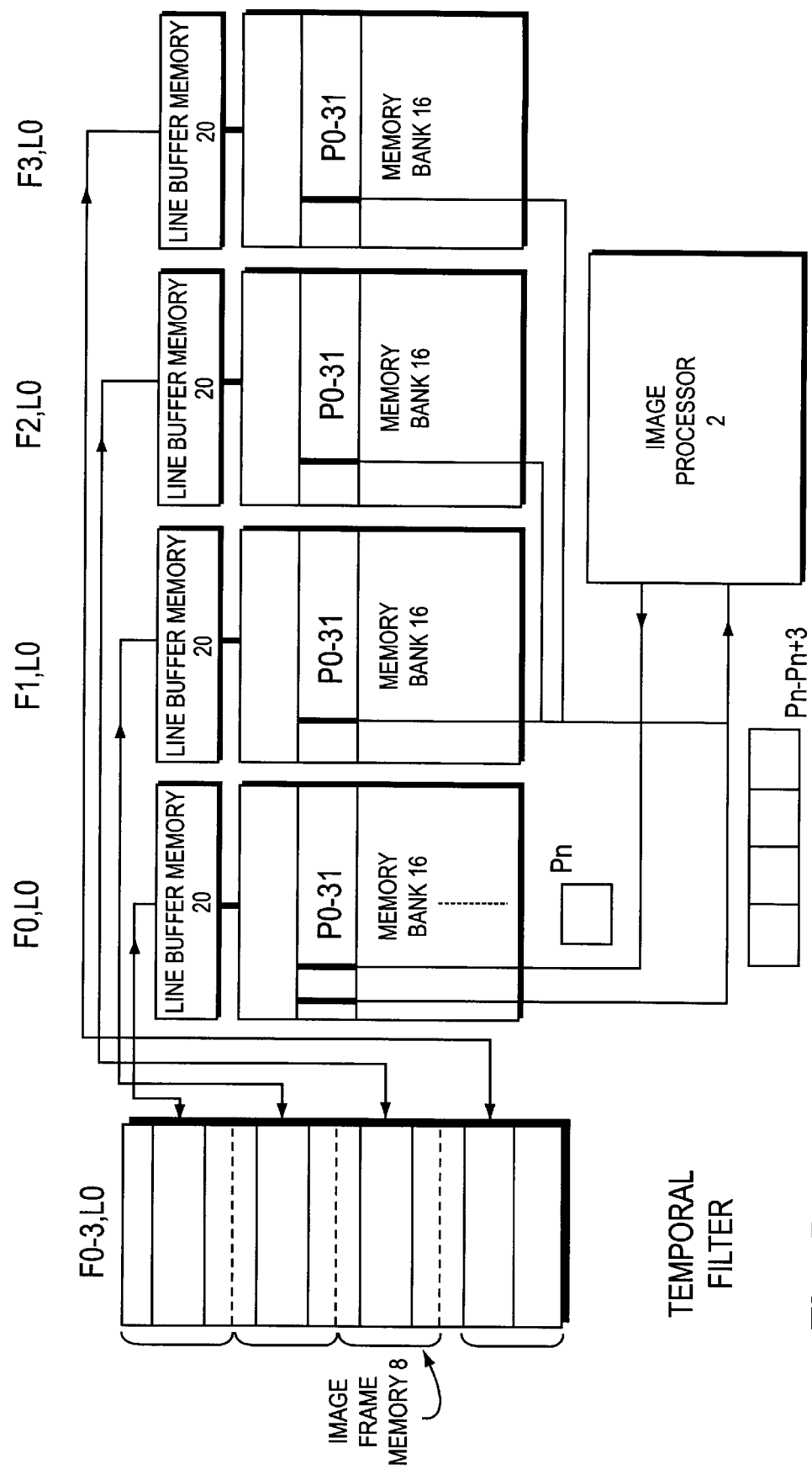
FIG. 5 illustrates the operation of the image processing system in an inter-raster-line mode performing a temporal filtering operation.

FIG. 5 illustrates a temporal filtering operation. This temporal filtering operation also takes place as an inter-raster-line mode operation as the pixel data values to be manipulated together are from respective different frames of the image. As shown in FIG. 5, each bank 16 stores a raster line from the same position but from a different frame. Thus, the raster line stored in the banks in this illustrated example are F0, L0; F1, L0; F2, L0 and F3, L0. A data word read by the image processor 2 as a single operation from the data buffer memory 4 for the pixel position 9 would thus be composed of the pixel data values F0, L0, P9; F1, L0, P9; F2, L0, P9 and F3, L0, P9.

Once again, as the pixel data values that result from the temporal filtering operation will need to be written to different banks, this takes place as several separate operations with only a single bank being written to at any given time. It will be noted that the image frame memory 8 needs to have a larger capacity in this circumstance as it is required to store multiple complete frames of data that are shuffled into and out of the data buffer memory 4.

The above examples relate to 8-bit pixel data values. If the pixel data values are 16-bit data values then a single raster line will be spread over two adjacent banks 16. In this case, inter-raster-line mode reads will assemble a 32-bit data word from two 16-bit pixel data values taken from corresponding positions within the banks 16 that are separated by one intervening bank. Another way of considering this is that when the data buffer memory is accessed as contiguous address space and each bank has a storage capacity of M bytes then the data word will be assembled from the 16-bit pixel data values spaced apart by an address spacing of 2M. This relationship generalises such that if a raster line is spread over N banks, then the data word will be assembled from the pixel data values stored at address locations separated by N*M.

The modes of operation can also be sub-divided into read modes and write modes. Considering the operation in this way the system may be described as follows.

There are 3 read modes and 3 write modes for the processor:

Word Read Mode (Intra-Raster-Line)
Half Word Read Mode (Inter-Raster-Line)
Byte Read Mode (Inter-Raster-Line)
Word Write Mode (Intra-Raster-Lime)
Half Word Write Mode (Inter-Raster-Line)
Byte Write Mode (Inter-Raster-Line)

if the data buffer memory 4 has the form of an 4 KByte SRAM: (4 KByte=2^12), then the addressing would be:

Address 11 10 9 8 7 6 5 4 3 2 1 0
<Row in Bank><Bank><Word><Byte>

Word Read Mode is used when 8 or 16-bit data has been written from the frame memory 8 buffer to the SRAM buffer (data buffer memory 4). The word is read from one bank and the Byte bits are ignored by the RAM block. This mode will normally be used for horizontal spatial filtering.

Half Word Read Mode is used when 16-bit data has been written from the frame buffer (image memory 8) to the SRAM buffer. In this case a whole video line cannot be stored in a single 1 KByte bank and will use two banks. This mode will normally be used for 16-bit vertical spatial filtering or 16-bit temporal filtering.

| Address | Processor data bus, data source for word read | | | |
|---|---|---|---|---|
| Byte Bits | Byte 0 | Byte 1 | Byte 2 | Byte 3 |
| 00/01 | byte 0 bank n | byte 1 bank n | byte 0 bank n+2 | byte 1 bank n+2 |
| 10/11 | byte 2 bank n | byte 3 bank n | byte 2 bank n+2 | byte 3 bank n+2 |

Byte Read Mode is again used when 8 bit data has been written from the frame buffer to the SRAM buffer. The word read is made up of 1 byte from each of 4 banks, where the bank bits specify the first bank, n. This mode will normally be used for vertical spatial filtering or temporal filtering.

| Address | Processor data bus, data source for word read | | | |
|---|---|---|---|---|
| byte bits | Byte 0 | Byte 1 | Byte 2 | Byte 3 |
| 00 | byte 0 bank n | byte 0 bank n+1 | byte 0 bank n+2 | byte 0 bank n+3 |
| 01 | byte 1 bank n | byte 1 bank n+1 | byte 1 bank n+2 | byte 1 bank n+3 |
| 10 | byte 2 bank n | byte 2 bank n+1 | byte 2 bank n+2 | byte 2 bank n+3 |
| 11 | byte 3 bank n | byte 3 bank n+1 | byte 3 bank n+2 | byte 3 bank+3 |

Half Word and Byte read modes use more power as 2 or 4 banks of SRAM are being used simultaneously rather than 1. (Preferably, with pipelining of the read, only the appropriate 8, rather than 32, sense amps will be enabled).

The Read state of the 1 KByte banks have multiplexers to implement bank musing and byte rotation function. These musing arrangements allow the data word to be assembled from pixel values concatenated in the order needed by the image processor. This is helpful in allowing the data within the banks to be reused without all having to be reloaded in a different order, e.g. in the case of a sliding filer.

The architecture of the SRAM and the address generation modes make it possible to implement horizontal spatial filtering (X-plane), vertical spatial filtering (Y-plane) and temporal filtering (Z-plane) by changing the way in which the SRAM is accessed depending on the type of processing required.

The following discusses these 3 types of filtering/processing and how the SRAM architecture reduces the data bandwidth.

Horizontal Spatial Filtering (X-plane)

This is represented in FIG. 2. This shows the following modes—word read mode and word write mode. In this case the word read contains 4 pixels of data.

Vertical Spatial Filtering (Y-plane)

This is represented by FIG. 4. This shows the fame line m (in this case o) being stored in bank 0, frame line m+1 in bank 1, frame line m+2 in bank 2 and so on. The relative positions of the pixels in each bank is the same. This then uses byte read mode to read the same byte in each bank of four adjacent banks. These are combined and a word returned to the processor. By aligning the pixels, these four bytes correspond to the same pixel in a frame line of 4 adjacent frame lines.

So by reading a word from each of 4 banks and muxng and enabling the appropriate byte from each bank onto the processor Read Data bus, 4 vertical pixels have been read into the processor for processing. The address used will give the address of the first bank to be addressed and it is this which puts its byte onto byte 0 of the word and so on until the last bank puts its byte onto byte 3 of the word read. Data is written back from the processor in one of three modes, Word Write Mode, Half Word Write Mode or Byte Write Mode.

This is a lower data rate but it is accepted that in general if X pixels are read for filtering and Y pixels are the result, X will generally be greater than Y.

Consider what happens when processing has finished from line m. In this diagram, line m+4 will be read from the frame buffer and will overwrite line m in the SRAM. In this case, to avoid byte rotation in the processor (some processors do not support byte rotation; ARM processors do provide byte rotation), the first addressed bank will be bank 1, so now bank 1 will put its byte onto byte 0 of the word read. As any bank can be the first addressed, this means that any bank can put its byte onto any of the 4 positions of the word read, so effectively a rotate function is performed.

Temporal Filtering (Z-plane)

This is represented by FIG. 5. This uses the same technique as for the Vertical Spatial filtering, except the same frame line is being read, but from different frames.

16-bit Pixel Data 16-bit, or half word, pixel data will be stored in 2 banks of SRAM. Using the addressing shown in FIG. 2, this means 8 words will store 16 pixels and 1 KByte will store 32×16 pixels=512 pixels. The remaining 352 pixels will be stored in the next bank. For Word Read Mode, a word will contain 2 pixels. Because the line now occupies two banks, to perform Vertical Spatial or Temporal filtering means pixels must be read from bank n and bank n+2. So Half Word Read Mode reads a half word from bank n and the other half word from bank n+1. As for Byte Read Mode any bank can be first addressed, so again a rotate function is performed in the output musing/enabling of the SRAM bank.

Word Write Mode writes the word to one bank.

Half Word Write Mode writes the upper or lower halfword to one bank.

Byte Write Mode writes one of four bytes to one bank. One type of manipulation that often needs to be performed by image processors is horizontal filtering. Accordingly, in the preferred embodiments of the invention, in said intra-raster-line mode, said image processor performs spatial filtering in a direction along said one raster line.

The proposed timing for the SRAM is in terms of memory access cycles. How this is related to the processor clock is deliberately not defined—it depends on the target speed for the processor.

processor write to SRAM—1 cycle processor read from SRAM—1 cycle (uses sense amps)

line buffer write to SRAM (8 words)—1 cycle line buffer read from SRAM (8 words)—2 cycles (uses inverters to save power)

Figure 6:
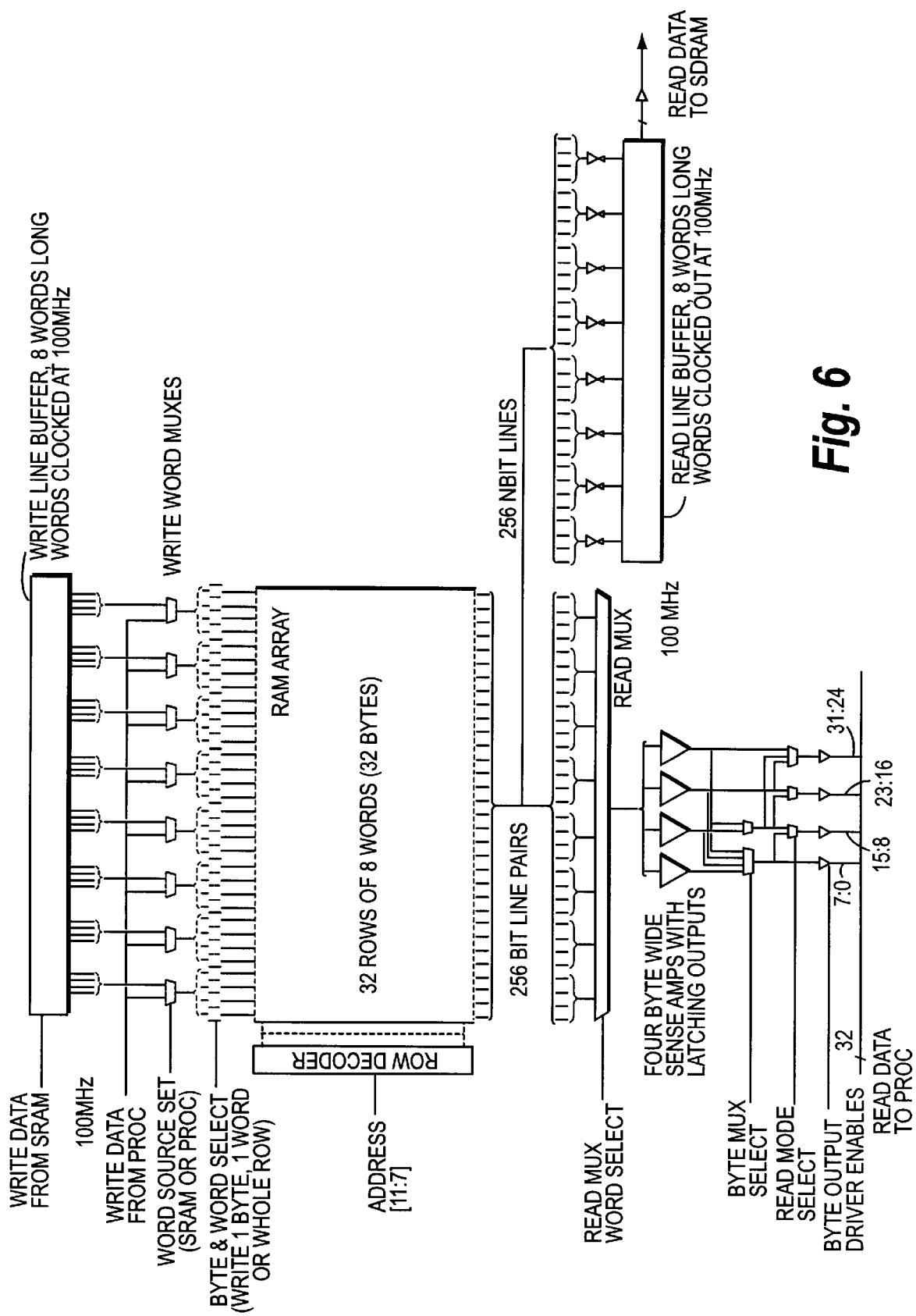
FIG. 6 illustrates a multiplexing arrangement for writing data to and reading data from the data buffer memory.

FIG. 6 illustrates in more detail the multiplexing arrangement for writing to and reading from one of the banks of memory cells. The reordering circuit for concatenating the pixel values in different orders is provided by the multiplexing circuits of the output of the Read Mux.

Various improvements may be made to reduce power consumption and circuit area. It is not efficient to have all four banks of SRAM driving onto one 256 bit bus and then routing this to one line read buffer. A similar argument applies for the line write buffer. Therefore, it is simpler to have one write and one read buffer per bank. Even so, these line buffers can have difficulty in pitch matching to the RAM cells. To avoid the use of 256 sense amps (disadvantageous for power and area reasons), the read from the RAM array to the read buffer takes 2 cycles and uses inverters.

The logic equations required for the mwxig arrangement shown on the 1 kByte RAM Bank of FIG. 6 are:

Byte Select: format is Mux: mux_input - read mode,
byte bits | read mode, byte bits | etc
4-to-1 mux:   0 - Byte mode, 00 | Half word mode, 0- | Word mode. --
              1 - Byte mode, 01
              2 - Byte mode, 10 | Half word mode, 1-
              3 - Byte mode, 11
2-to-1 mux:   0 - Half word mode, 0- | Word mode, --
              1 - Half word mode, 1-
Read Mode Select: format is Bits[] mux_input - read mode =

-continued

| mux_output | | |
|---|---|---|
| Bits [7:0] | all modes | = byte 0 \| byte 1 \| byte 2 \| byte 3 |
| Bits [15:8] | 0 - Byte mode | = byte 0 \| byte 1 \| byte 2 \| byte 3 |
| | 1 - Half/Word mode | = byte 1 \| byte 3 |
| Bits [23:16] | 0 - Byte/Half mode | = byte 0 \| byte 1 \| byte 2 \| byte 3 |
| | 1 - Word mode | = byte 2 |
| Bits [31:24] | 0 Byte mode | = byte 0 \| byte 1 \| byte 2 \| byte 3 |
| | 1 - Half mode | = byte 1 \| byte 3 |
| | 2 - Word mode | = byte 3 |

Output Driver Enables: format is Enable=read mode, bank | read mode, bank | etc

| | | |
|---|---|---|
| Enable byte 0 = Byte mode, bank n | \| Half mode, bank n | \| Word mode |
| Enable byte 1 = Byte mode, bank n+1 | \| Half mode, bank n | \| Word mode |
| Enable byte 2 = Byte mode, bank n+2 | \| Half mode, bank n+2 | \| Word mode |
| Enable byte 3 = Byte mode, bank n+3 | \| Half mode, bank n+2 | \| Word mode |

Figure 7:
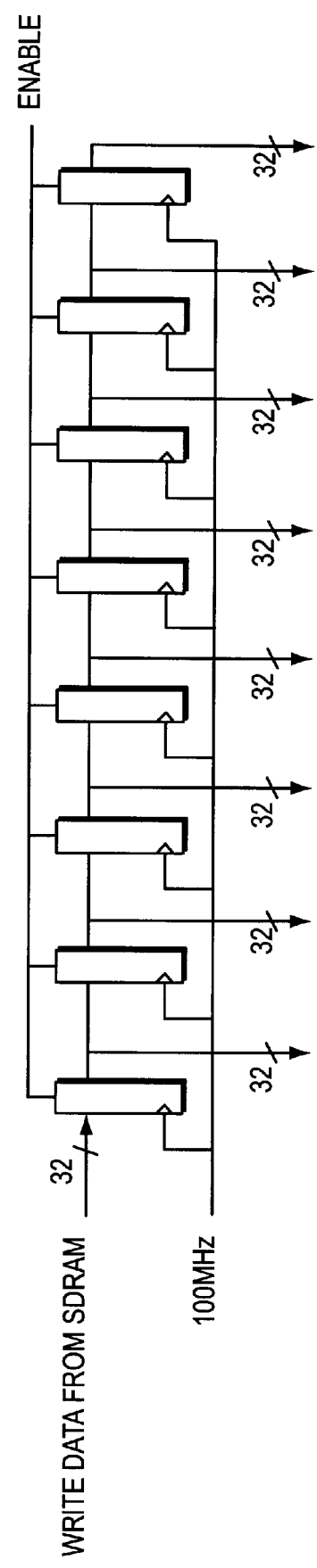
FIG. 7 illustrates an alternative embodiment for a write line buffer.

FIG. 7 illustrates one possible embodiment for the write like buffer of FIG. 6. This comprises a series of 32-bit registers arranged in a cascade such that data can be written into them from the image frame memory 8 over eight cycles. When this data is to be transferred into a row of memory cells within a bank of the data buffer memory 4, this is carried out in parallel as eight 32-bit writes.

Figure 8:
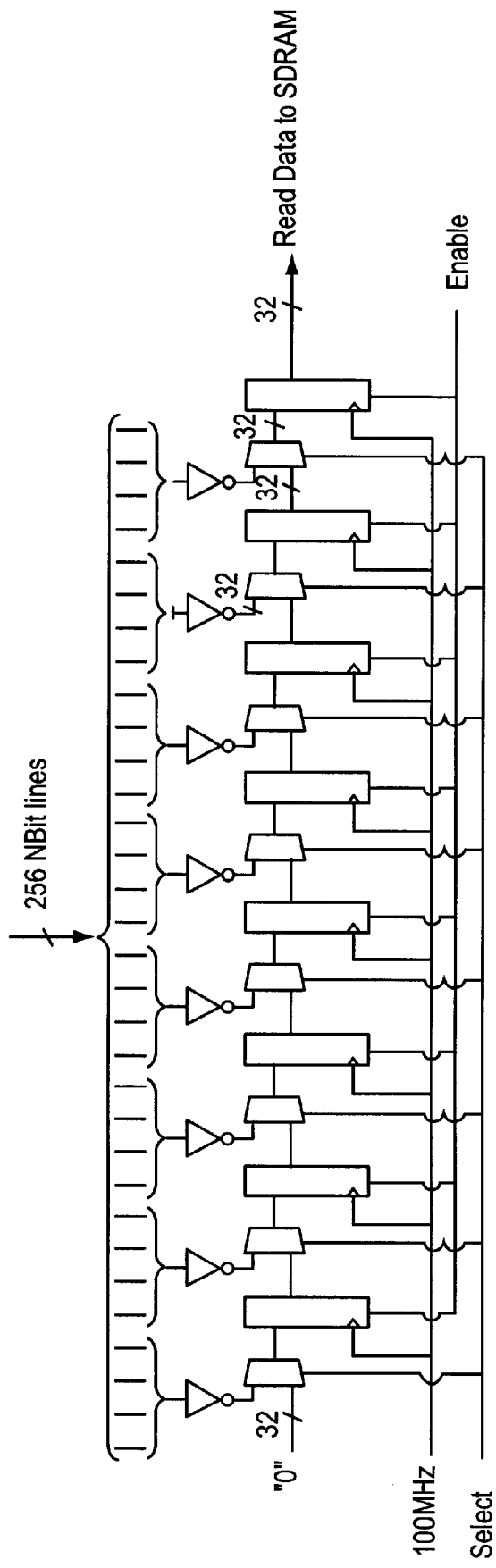
FIGS. 8 and 9 illustrate altenative embodiments for a read line buffer.
Figure 9:
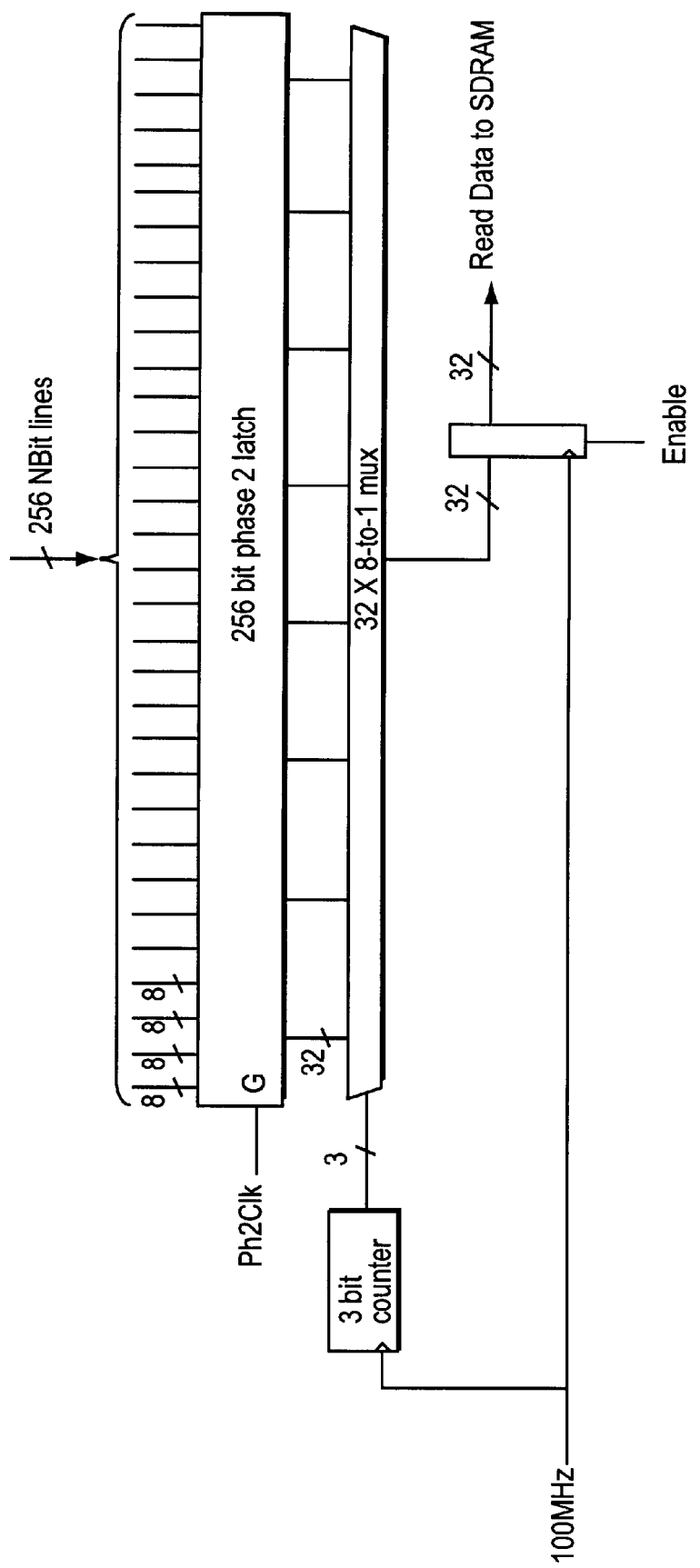

FIGS. 8 and 9 illustrate two possible line buffers for performing reads from the data buffer memory 4 to the image frame memory 8. In this case, the eight 32-bit words within a row of the bank are read in parallel into registers with these registers then being read in a serial fashion to stream eight 32-bit data words out to the image frame memory 8.

Although illustrative embodiments of the invention have been described in detail herein with reference to the accompanying drawings, it is to be understood that the invention is not limited to those precise embodiments, and that various changes and modifications can be effected therein by one sidled in the art without departing from the scope and spirit of the invention as defined by the appended clams

What is claimed is:

1. Apparatus for processing image data, said apparatus comprising:
   (i) an image frame memory for storing pixel data defining an image, said pixel data being divided into raster lines of pixel data values;
   (ii) an image frame memory bus;
   (iii) a data buffer memory, coupled to said image frame memory via said image frame memory bus, for storing a subset of said raster lines of pixel data values defining said image;
   (iv) an image processor, coupled to said data buffer memory via an image processor bus, for performing image processing upon said subset of said raster lines of pixel data values stored in said data buffer memory; wherein
   (v) said data buffer memory has a plurality of banks of memory cells, each bank of memory cells being divided into a plurality of rows and a plurality of columns of memory cells and said image frame memory bus is a common image frame memory bus shared by said plurality of banks of memory cells;
   (vi) said image processor bus transfers data words between said data buffer memory and said image processor, each data word comprising pixel data values for a plurality of pixels within said image;
   (vii) said image processor and said data buffer memory being operable in an intra-raster-line mode to read one bank of memory cells to transfer a data word comprising a plurality of spatially adjacent pixel data values from within one raster line; and
   (viii) said image processor and said data buffer memory being operable in an inter-raster-line mode to read a plurality of banks of memory cells to transfer a data word comprising a plurality of pixel data values from within differing raster lines.

2. Apparatus as claimed in claim 1, where, in said intra-raster-line mode, said image processor performs spatial filtering in a direction along said one raster line.

3. Apparatus as claimed in claim 1, wherein in said inter-raster-line mode, said data word comprises a plurality of pixel data values taken from corresponding row and column positions within each of a plurality of different banks of memory cells.

4. Apparatus as claimed in claim 3, wherein said plurality of banks of memory cells store spatially adjacent raster lines, said data word comprises spatially adjacent pixel data values in a direction perpendicular to said raster lines and said image processor performs spatial filtering in said direction perpendicular to said raster lines.

5. Apparatus as claimed in claim 3, wherein said plurality of banks of memory cells store temporally adjacent raster lines, said data word comprises temporally adjacent pixel data values form a common spatial position within said image and said image processor performs temporal filtering at said common spatial position.

6. Apparatus as claimed in claim 1, wherein plurality of banks of memory cells within said data buffer memory form a contiguous address space that is accessed using addresses generated by said image processor.

7. Apparatus as claimed in claim 5, wherein each of said banks of memory cells has a size of M separately addressable storage locations, each of said raster lines is stored over N banks of memory cells, and, in said inter-raster-line mode, said data word comprises pixel data values spaced by M*N address locations within said address space.

8. Apparatus as claimed in claim 7, wherein N=1.

9. Apparatus as claimed in claim 8, wherein N=2.

10. Apparatus as claimed in claim 1, wherein a line buffer is disposed in said image frame memory bus between said image frame memory and said data buffer memory, said line buffer serving to buffer a plurality of pixel data values that are transferred in parallel between said line buffer and a full row of memory cells.

11. Apparatus as claimed in claim 10, wherein said image processor is prevented from accessing said data buffer memory whist said plurality of pixel data values are transferred in parallel between said line buffer and said full row of memory cells, said image processor being permitted to access said data buffer memory whilst pixel data values are transferred between said line buffer and said image frame memory.

12. Apparatus as claimed in claim 1, wherein said image processor writes pixel data values to said data buffer memory as processing operations that write to a single bank of memory cells weak said data buffer memory.

13. Apparatus as claimed in claim 1, wherein said image frame memory is a video RAM or SDRAM.

14. Apparatus as claimed in claim 1, wherein said image processor is a microprocessor operating under program instruction control.

15. Apparatus as claimed in claim 1, wherein pixel data values from within a raster line of said subset of raster lines of pixel data values are stored within memory cells of respective consecutive rows of memory cells within a bank of memory cells.

16. Apparatus as claimed in claim 1, further comprising a reordering circuit for selecting the order in which said pixel data values are concatenated together to form said data word.

17. A method of processing image data, said method comprising the steps of
- (i) storing pixel data defining an image within an image frame memory, said pixel data being divided into raster lines of pixel data values;
- (ii) storing a subset of said raster lines of pixel data values defining said image within a data buffer memory, said data buffer memory being coupled to said image frame memory via an image frame memory bus;
- (iii) performing image processing upon said subset of said raster lines of pixel data values stored in said data buffer memory with an image processor, said image processor being coupled to said data buffer memory via an image processor bus; wherein
- (iv) said data buffer memory has a plurality of banks of memory cells, each bank frame memory cells being divided into a plurality of rows and a plurality of columns of memory cells, pixel data values from within a raster line of said subset of raster lines of pixel data values being stored within memory cells of respective consecutive rows of memory cells within a bank of memory cells;
- (v) said image processor bus transfers data words between said data buffer memory and said image processor, each data word comprising pixel data values for a plurality of pixels within said image;
- (vi) said image processor and said data buffer memory being operable in an intra-raster-line mode to read one bank of memory cells to transfer a data word comprising a plurality of spatially adjacent pixel data values from with one raster line; and
- (vii) said image processor and said data buffer memory being operable in an inter-raster-line mode to read a plurality of banks of memory cells to transfer a data word comprising a plurality of pixel data values from within differing raster lines.

\* \* \* \* \*